May 15, 1923.
C. L. SAVIEO
BOLT TURNING MACHINE
Filed April 13, 1921
1,454,983
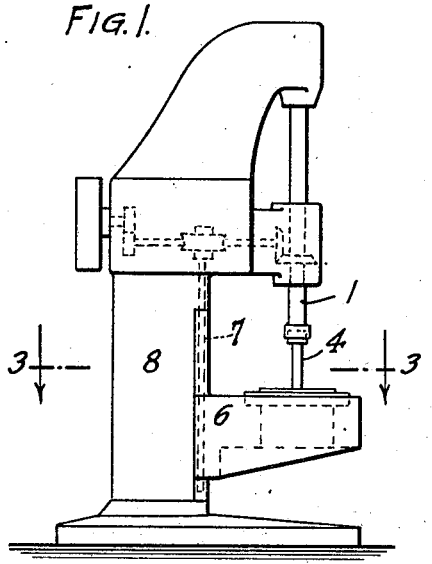
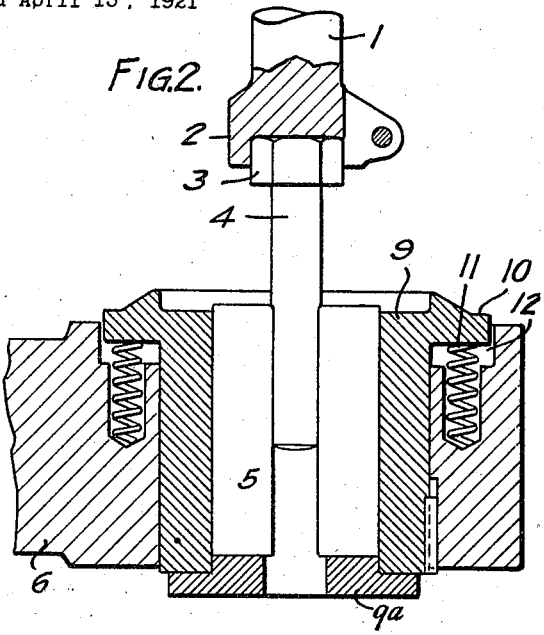
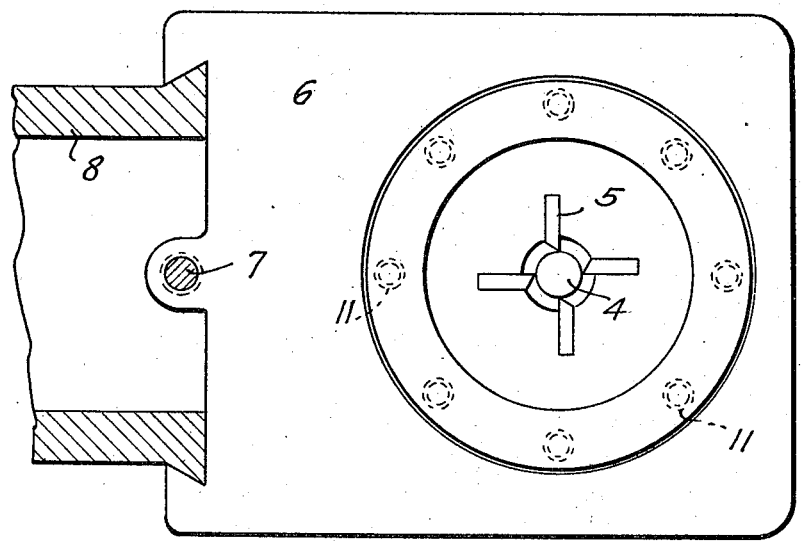
INVENTOR
Charles L. Savieo
BY
ATTORNEY Patented May 15, 1923.

1,454,983

UNITED STATES PATENT OFFICE.

CHARLES L. SAVIEO, OF LIMA, OHIO, ASSIGNOR TO WALTER H. FOSTER, OF NEW YORK, N. Y.

BOLT-TURNING MACHINE.

Application filed April 13, 1921. Serial No. 461,089.

*To all whom it may concern:*

Be it known that I, CHARLES L. SAVIEO, a citizen of the United States, and resident of Lima, Ohio, have invented certain new and useful Improvements in Bolt-Turning Machines, of which the following is a specification.

My invention aims to provide an improved machine of this class which will automatically avoid injury to the cutters and make it possible to operate with less attention from the operator and with correspondingly increased speed.

The accompanying drawings illustrate a machine embodying the invention,

Fig. 1 is a side elevation of the machine;

Fig. 2 is a vertical section through the cutter head;

Fig. 3 is a plan of the same.

In bolt turning machines, the cutters have longitudinal edges which turn the shank and have cutting edges on their ends which finally come into contact with the under face of the head of the blank and turn this flat. The machine has to be watched in order to stop the feed as soon as the head of the blank is properly faced, and generally to retard the speed as the head comes into contact with the cutters, so as to avoid injury to the blank head and also to the cutters.

My invention provides a scheme, applicable to bolt turning machines of great variety, whereby a spring or similar yielding mechanism is arranged to take up pressure of the feed as the blank head comes into contact with the cutters, so that the feed will be retarded at this time. In the old machines the trip which automatically stops the feed had generally to be operated before the end of the feeding operation for safety sake. With my yielding mechanism the trip will generally be operated after a partial yield sufficient to permit continued rotation of the work for several turns without substantial advance and thus to produce a very smooth face before the tripping operation which stops the advance.

The machine illustrated is of the vertical type with a spindle 1 having a socket 2 at its lower end in which is clamped the head 3 of the blank whose shank 4 is forced into the opening within the cutters 5 of the cutter head. The bed 6 of the machine which carries the cutter head is raised or lowered by means of a worm shaft 7, Fig. 3, the bed being guided on suitable ways on the standard 8. The means for securing and controlling the rotation of the spindle 1, and the vertical feed and return of the bed 6 are illustrated in dotted lines in Fig. 1. These may be of any usual or suitable design. Likewise the machine may be of the vertical type with either an upward or downward feed or of any one of various known horizontal types.

The relieving or retarding means is applicable to any one of the numerous types of bolt turning machines known. For this purpose the ring or head 9 which with its base plate 9$^a$ carries the cutters 5, and which may also be of any one of a number of known designs, is arranged to yield with respect to its support, the bed 6; the head 9 having at its upper end an external flange 10 overlying a number of spiral springs 11 set in sockets in the bed, and the bed having a circular recess 12 in which the flange 10 can move vertically.

Now, as the head of the blank and the upper ends of the cutters come together during a feeding movement, the springs will yield so that the rate of feed will be retarded while the facing of the head is taking place. The continued rotation of the blank with a retarded feed will accomplish a perfect facing of the blank. Before the springs are compressed to the limit and before the flange 10 strikes the bottom of the recess 12, the usual trip will be operated to stop the feed and return the parts to their starting points.

In many previous machines the feed has been automatically stopped before the facing operations commence. The continued operation has then been under control of a hand lever, so that the final feeding and facing have been hand controlled. And if the operator were not at hand, the downward feed would stop just before the head of the blank and there would be a delay and a loss in the output of the machine, and also the blank would be marked with a ring close under the head from the continued operation of the cutters at one point.

The spring or other yielding mechanism may be introduced at any point where it will retard the longitudinal feed at or near the end of the turning operation.

Though I have described with great particularity of detail certain specific embodiments of my invention, yet it is not to be understood therefrom that the invention is restricted to the particular embodiments disclosed. Various modifications thereof may be made by those skilled in the art without departing from the invention as defined in the following claims.

What I claim is:

1. A machine for turning and facing headed bolts including in combination mechanism for securing relative feeding and rotary movement and a spring device arranged to hold the tool up to the work during the turning of the shank of the bolt and to yield when the tool engages the face of the bolt head and therefore to cause a slower feeding movement near the end of the operation.

2. A machine for turning headed bolts including in combination mechanism for securing relative feeding and rotary movement and a spring device arranged to yield to the pressure of the feed, the actual rate of feed being determined entirely by the resistance of the work to the cutter under pressure of the spring.

3. A machine for turning and facing headed bolts including in combination a vertical spindle adapted to engage the head of a blank, a cutter head 9, a carrier 6 therefor, the head having a flange 10 overlying springs set in sockets in the carrier and the carrier having a recess in which said flange can move and having shoulders for limiting such movement of the flanges.

In witness whereof, I have hereunto signed my name.

CHARLES L. SAVIEO.